Jan. 19, 1937.   J. P. MUELLEMAN   2,068,190
ELECTRICAL APPARATUS
Filed Feb. 17, 1934    2 Sheets-Sheet 1
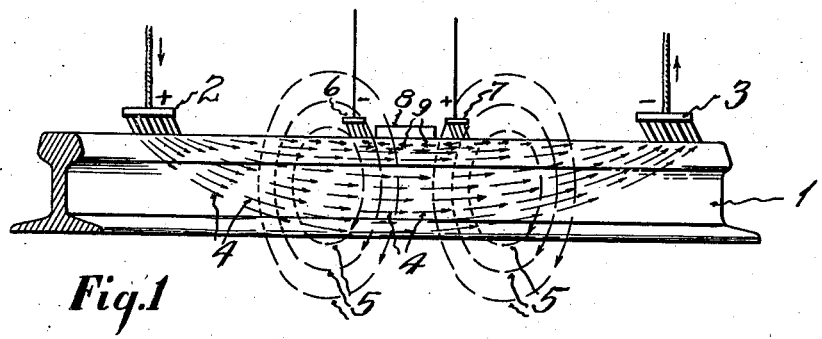
Fig.1
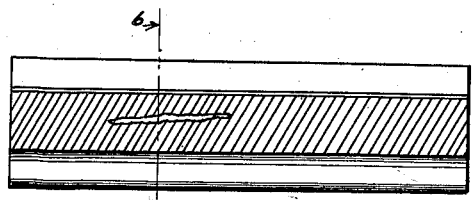
Fig.8    Fig.7
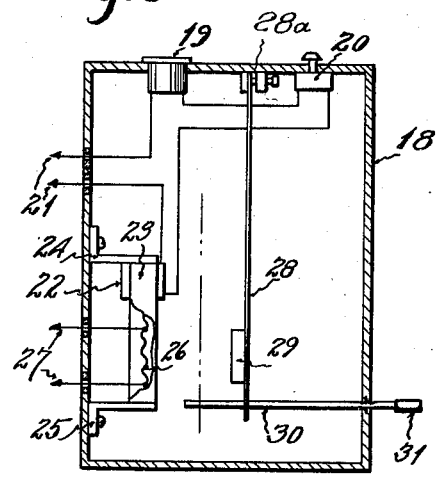
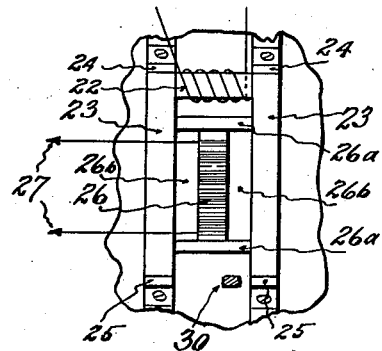
Fig.9
Fig.10
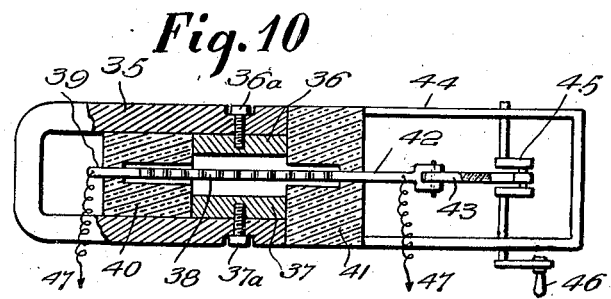
Inventor
Joseph P. Muelleman
by Benj. Chrony
Attorney Jan. 19, 1937.  J. P. MUELLEMAN  2,068,190
ELECTRICAL APPARATUS
Filed Feb. 17, 1934  2 Sheets-Sheet 2

Inventor
Joseph P. Muelleman
By Ben J. Chrony
Attorney

Patented Jan. 19, 1937

2,068,190

UNITED STATES PATENT OFFICE 2,068,190

ELECTRICAL APPARATUS

Joseph P. Muelleman, Chicago, Ill.

Application February 17, 1934, Serial No. 711,747

9 Claims. (Cl. 175—183)

This invention relates to electrical apparatus for detecting defects in metallic members. More particularly this invention relates to electrical apparatus for detecting defects in metal wire, bars, rods and rails.

An object of this invention is to provide a simple, effective and efficient method and apparatus for testing metal wire, bars, rods and rails for defects therein.

Another object of this invention is to provide a simple, effective and efficient method and apparatus for testing metal wire, bars, rods and rails for defects therein, and recording the positions of serious internal defects.

Still another object of this invention is to provide an apparatus for determining and recording the positions of internal defects in rails whereby the magnitude of the defects may be determined.

A further object of this invention is to provide an apparatus adapted for accurately and efficiently testing and determining defects in old, turned, badly burned, shellyed and/or flowed rails.

Other and further objects of this invention will be apparent to those skilled in the art to which it relates, from the following specification and the appended claims.

According to this invention I provide an arrangement for testing wire, bars, rods and rails for serious internal defects in an efficient, rapid and accurate manner.

I am aware of certain systems employed for testing metallic materials; however, these systems appear to be handicapped, in that they are for practical purposes limited to testing speeds of 3 to 7 miles of material per hour for testing with maximum accuracy. The accuracy of these systems also is limited and they are impractical for testing old, turned, badly burned, shellyed, and flowed railroad rails and metallic bodies having similar characteristics.

The testing system of my invention may be used readily at speeds of 5 to 20 miles of material per hour and higher, with proper contact adjustment of the brushes feeding electric currents to the elongated metal member or members being tested, and with efficient adjustment of the amplifier, recorder and associated apparatus.

My invention is particularly adapted to the testing of railroad rails and the distinction between the indications obtained by relatively unimportant surface rail defects, and shellyed and flowed rail defects and serious internal defects is readily obtained thereby without making a large number of visual inspections. This, of course, greatly facilitates testing operations and permits the accurate testing of a greater number of miles of railroad track and also decreases the chances of error in the operations.

A further advantage of the apparatus of my invention is that the record obtained therefrom shows the exact relative size of and extent of the recorded surface or internal defects.

Other features of my invention will be apparent from the following specification, claims and drawings forming a part hereof.

Referring to the drawings, briefly,

Fig. 1 is a view illustrating the principle of operation of the magnetizing and indication pick-up unit of my invention;

Figs. 6 and 7 illustrate less serious defects, and

Figs. 8, 9 and 10 illustrate the calibrating apparatus.

Figure 2:
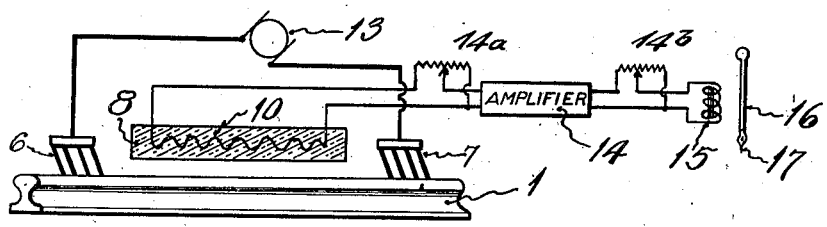
Figs. 2 and 2a are views illustrating schematically the connections employed.

Referring to Fig. 1 of the drawings in detail, reference numeral 1 designates a metallic member, such as a railroad rail, being tested for serious defects to be described in further detail in the specification following.

An electric current produced by a suitable generator is passed through the section of the rail between the contacting brushes 2 and 3, as indicated by the arrows 4. It is, of course, apparent that this electric current may be caused to flow in the opposite direction from that indicated by the arrows, if desired. This current sets up a magnetic field designated by the broken lines 5. This magnetic field is fairly uniform around the current paths through the rail when the metallic structure of the rail is uniform. However, if the structure of the rail is defective the defects tend to distort the current paths and as a result the magnetic field is not uniform, but also becomes distorted. The device of my invention produces indications of these structural defects through their effect upon the electrical resistance and current carrying properties of the rails.

My invention also has as an object the neutralization or elimination of indications obtained from rail surface defects. Generally these defects are not serious, and for that reason it is not essential that permanent records thereof be obtained. This latter object is in part accomplished by neutralizing the magnetic field set up by electric currents traveling in the cross-section of the rail adjacent to the upper surface of said rail. Brushes 6 and 7 are connected to a suitable generator or other source of current supply, such as that employed in circuit with the brushes 2 and 3. It is, of course, apparent that these brushes 6 and 7 may be connected to the same generator or source of current supply as brushes 2 and 3; the electric current through the circuit of brushes 6 and 7 is opposite in direction to the current passing between brushes 2 and 3 and is of much lower magnitude or amperage. When the same source of current supply is used in connection with both sets of brushes it is desirable to connect variable resistance units 6a and 7a in series with the brushes 6 and 7, respectively, for the purpose of adjusting the current through these latter brushes. For purposes of illustration the current between brushes 2 and 3 is about 3,000 amperes at a voltage of 2 to 4 volts; while the current between brushes 6 and 7 is about 100 amperes at a voltage ranging between 2 and 10 volts. The heavy current saturates the head of the rail, while the current of less intensity penetrates usually between 4 and 7 millimeters. Since this current of less intensity flows in the opposite direction from that of the current of higher intensity, the effect of the magnetic fluxes adjacent to the surface of the head of the rail is neutralized or eliminated and indications of surface defects in the rail are rendered substantially negligible.

Figure 2A:
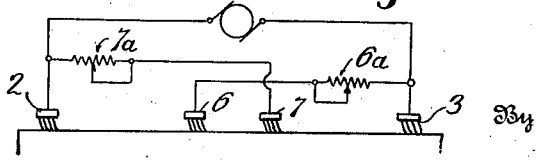

A pick-up unit 8, including a corrugated metal ribbon strip 10, embedded in insulating material of phenol condensation material as shown in Fig. 2, is employed to detect changes in magnetic flux distribution due to distortion of the current path through the rail. In this figure only one set of brushes 6 and 7, connected to a suitable source of current supply 13, is illustrated; however, it is obvious that the arrangement shown in Fig. 1 or Fig. 2a may be employed.

The pick-up unit ribbon 10 is connected to the input of the power amplifier 14, which is preferably of the electron discharge device type employing a plurality of cascade stages of power amplification. It is preferred that an amplifier employing high gain vacuum tubes, such as pentodes, is used, inasmuch as the electro-motive force induced into the ribbon element of the pick-up unit is very small and must be greatly amplified before the effect thereof can be recorded by the recording pen 17 which is actuated by the armature 16 of the winding 15.

The corrugated or undulated ribbon 10 of the pick-up unit 8 is preferably made of a strip of duralumin or similar metallic alloy or metal. While I have shown the ribbon corrugated to closely simulate a sine function, it may be transversely fluted in various shapes.

Figure 3:
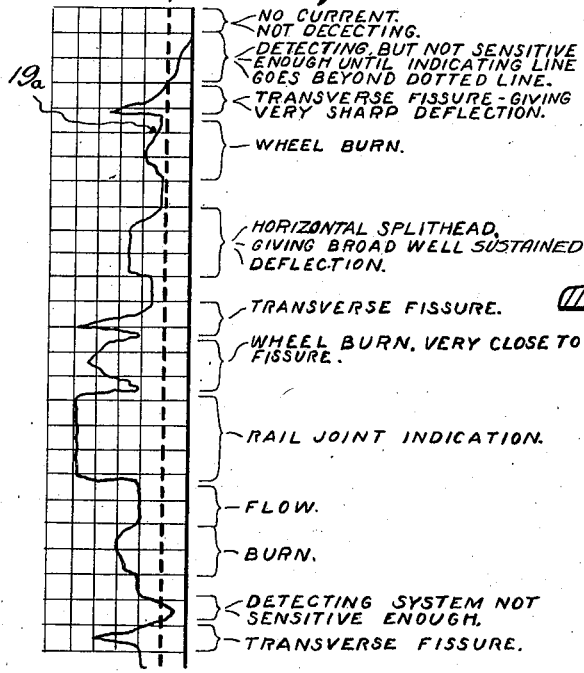
Fig. 3 illustrates graphically the type of indications obtained from different defects located in rails.

In Fig. 3 I have illustrated graphically the general appearance of indications received from different types of rail defects and rail joints. The dotted line 18a designates the magnitude of the current flowing through the electro-magnetic winding 15 when the amplifier 14 is adjusted for correct operation. The procedure of adjusting the amplifier will be described in further detail in conjunction with Figs. 8, 9 and 10 of the drawings.

As the input of the amplifier 14 is energized by the electro-motive forces induced into the ribbon pick-up element, the energization of the electro-magnetic winding 15 is varied in accordance therewith. As the pick-up unit is moved over the rail, together with the contacting brushes and source or sources of current supply, by means of a suitable carriage, the effects of various defects on the rail head or in the rail are recorded by the electro-magnetically actuated pen 17 on an elongated record receiving sheet, in the form of a more or less irregular curve 19a. The various forms of indications received from the different types of defects, such as transverse fissures, wheel burn, split head and flowed metal, are illustrated in Fig. 3. This graph illustrates the type of curve obtained when the current passing through the brushes 6 and 7 is of insufficient intensity to neutralize the main magnetizing current in and near the upper surface of the rail head, inasmuch as indications of wheel burns are rather prominently registered. It is, of course, not necessary to eliminate indications of these and similar surface defects with the system of my invention, since it is rather simple to detect the difference between these defects and serious internal defects, such as transverse fissures. These serious defects register a relatively sharp curve of short duration as distinguished from the relatively long duration indications produced by wheel burn, split head and such defects. A further advantage of the system of my invention is that the magnitude of the defect as well as the character thereof is recorded. For example, a serious defect gives a large amplitude indication, and vice versa. The sensitivity of the detecting system is also constantly recorded and an accurate check on the measurements, therefore, may be had at all times.

Figure 4:
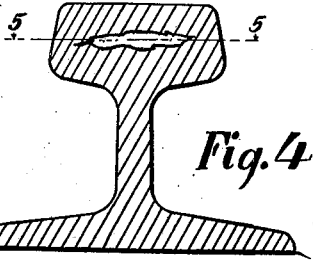
Figs. 4 and 5 illustrate cross-sections of rails, showing serious internal defects desired to be detected.
Figure 6:
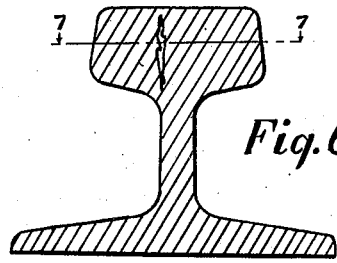
Figure 5:
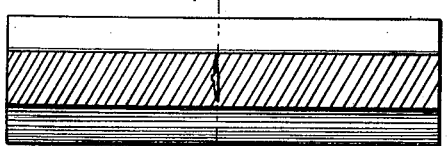

A transverse fissure is illustrated in Figs. 4 and 5. A fissure of this type distorts the current path through the rail, causing the current to concentrate more or less in sections of the rail head adjacent to the surfaces of the head. It is apparent that the path of the current will be more or less distorted, depending upon the size of the fissure. A horizontal split head type of defect, shown in Figs. 6 and 7, gives a broad sustained indication as illustrated, inasmuch as this type of defect causes a different type of current path distortion.

In calibrating the indicating and recording apparatus for purposes of determining and adjusting the sensitivity thereof, I prefer to employ the apparatus illustrated in Figs. 8 and 9 or a modified form thereof shown in Fig. 10. The calibrating apparatus is housed in a cabinet 18 of conventional design. A milliammeter 19, mounted in a wall of the cabinet, is connected in series with the variable resistance 20, also mounted in a wall of the cabinet, and the solenoid winding 22 to the electrical battery connections 21. An iron core 23, which may be made of laminated material, is mounted on the inside of the cabinet by suitable brackets 24 and 25. One leg of this core is formed to support the winding 22 which functions to magnetize this iron core to a desired intensity so that a certain magnetic flux is caused to penetrate the area surrounding the ribbon 26 which is supported between the pole pieces 26b by suitable strips of insulating material. This ribbon 26 is connected to the leads 27 which are connected to the input of the amplifier 14 (Fig. 2) during the calibration of the amplifier and recording apparatus.

In the calibration of the amplifier and associated apparatus, the leads 27 are connected to the input of the amplifier 14 and then the pendulum 28, supported from the pivot member 28a at the top of the cabinet, having the weight 29 associated therewith, is set into oscillation by the rod 30. This pendulum functions to periodically distort the magnetic field passing through the ribbon member 26 of the calibrator in such a way that an electro-motive force of a certain magnitude is induced into this member. The intensity of the magnetizing force in the core 23, produced by the winding 22, may be varied by varying the current through this winding by the rheostat 20. A current of predetermined magnitude is passed through this winding and the magnitude of this current is determined from the meter 19. The magnetic field set up by the winding 22 is distorted periodically by the pendulum 28 and the metallic member 29. This latter member in this way serves two purposes, one being to provide the pendulum weight and the other being to shift a portion of the magnetic lines of force of the magnetic unit.

When a predetermined current is passed through the winding 22 and the pendulum is swung through a predetermined arc a certain electro-motive force should be induced into the ribbon member 26 to be impressed upon the input of the amplifier. This predetermined electro-motive force produces a certain deflection of the pen armature 16 and if amplitude of the deflection of the pen is not sufficiently great the potentiometers 14a and 14b, connected to the input and output of the amplifier 14, respectively, are adjusted to cause the pen to deflect either more or less, as the case may be. In practice the current through the solenoid 15 of the pen is adjusted to be of a value corresponding to the dotted line 18a of the graph, Fig. 3. This value may be more or less than the normal current passing through the solenoid 15 when the pick-up unit 10 of the amplifier is not energized; this, of course, depends upon whether the amplifier output current is caused to increase or decrease in accordance with the energization of the amplifier input. It is, of course, obvious that either amplifier adjustment may be used in accordance with this invention.

In Fig. 10 a modified form of calibrator is illustrated in which a permanent magnet 35 is employed in place of an electric current energized solenoid or electro-magnet. Pole pieces 36 and 37 are attached to the poles of the magnet 35 by the small bolts 36a and 37a, respectively. A pick-up ribbon 38 is positioned to be movable longitudinally of the pole pieces. Members 39 and 42 of conducting material are supported in bearing members 40 and 41, respectively, and are attached to the ends of ribbon 38 for the purpose of moving this ribbon through the magnetic field between the pole pieces. This ribbon must be of sufficient rigidity to retain its shape during this movement and, if desired, it may be coated with a reinforcing and insulating coating of phenol condensation products. Where desired, this coating may be in the shape of a rod, with the ribbon embedded therein, of such a size that it conveniently slides between the pole pieces of the magnet, thus making it possible to eliminate the bearing members 40 and 41 or reduce them in size.

Connections 47 are provided to the ribbon member for the purpose of connecting the latter to the amplifier input circuit. A member 43, preferably of insulating material, is attached to the member 42 and to the crank 45 which is provided with the handle 46 for the purpose of rotating the crank and oscillating the ribbon back and forth through the magnetic field of the magnet.

While I have illustrated the testing apparatus of my invention as a single unit, it is understood that where rails of a railroad are to be tested a unit is to be employed for each rail for recording the characteristics of each rail separately.

Other modifications of my invention may be made without departing from the spirit and scope of my invention, and, while I have described it in considerable detail, I do not desire to limit it to those exact details except in so far as they are defined by the appended claims.

What I claim and desire to secure by Letters Patent of the United States is as follows:

1. In electrical apparatus for electromagnetically detecting internal flaws in the structure of elongated electrically conducting material, the combination of contacting means for passing an electric current of a certain magnitude substantially longitudinally through a section of said conducting material, an electromagnetic pick-up element adapted to be carried along surfaces of said conducting material, means for passing a second electric current of a magnitude smaller than that of said first current through a section directly beneath said pick-up element of said conducting material for neutralizing the effects of said first current directly beneath said pick-up element, and indicating means coupled to said pick-up element.

2. In electrical apparatus for electromagnetically detecting internal flaws in the structure of elongated electrically conducting material, the combination of a pair of brushes adapted to be carried over a surface of said material for passing an electric current through said material, a second pair of brushes for passing a second electric current through said material in opposite direction to said first current to neutralize the effect of said first current in sections of said material, a pick-up element comprising a transversely fluted elongated member, means for passing said pick-up element longitudinally along said conducting material over the zone substantially coinciding to the section in which the effect of said first current is neutralized, and indicating means coupled to said pick-up element.

3. In electrical apparatus for electromagnetically detecting internal flaws in the structure of elongated electrically conducting material, the combination of a pair of brushes, an electromagnetic pick-up element positioned between said brushes adjacent to the surface of said material, means for passing said brushes over said material for passing an electric current substantially longitudinally through said material in a certain direction, a second pair of brushes positioned between said first pair of brushes and contacting said material for passing a second electric current through said material in a direction opposite to that of said first electric current for neutralizing the magnetic effects of that portion of said first electric current which passes directly beneath said electromagnetic pick-up element, and indicating means coupled to said pick-up element for registering the effect of the flaws in said material.

4. In electrical apparatus for calibrating flaw indicating apparatus, the combination of an electromagnet, means for impressing an electric current upon the winding of said electromagnet, means for measuring said current, means for varying the magnitude of said current, means for periodically distorting the pattern of the magnetic field of said electromagnet, an elongated member positioned in the field of said lines of force for cutting said lines of force of said magnetic field each time said field is distorted for producing an electromotive force commensurate with the magnitude of the magnetic flux cut and means for impressing said electromotive force upon indicating apparatus to be calibrated.

5. In apparatus for calibrating flaw indicating apparatus, the combination of an electromagnet, a pendulum supported to oscillate adjacent to said electromagnet, means for setting said pendulum into oscillation for periodically distorting the magnetic field of said electromagnet, an elongated member positioned in the field of said electromagnet for cutting lines of force of said field in accordance with the motion of said pendulum, and means for impressing electromotive forces from said elongated member on circuits of indicating apparatus being calibrated.

6. In electrical apparatus for electromagnetically detecting internal flaws in the structure of elongated electrically conducting material, the combination of contacting means for passing an electric current of a certain magnitude substantially longitudinally through a section of said conducting material, an elongated transversely-corrugated electromagnetic pick-up element adapted to be carried along surfaces of said conducting material, means for passing a second electric current of a magnitude smaller than that of said first current through a section directly beneath said pick-up element of said conducting material for neutralizing the effects of said first current directly beneath said pick-up element, and indicating means coupled to said pick-up element.

7. In electrical apparatus for electromagnetically detecting internal flaws in the structure of elongated electrically conducting material, the combination of a pair of brushes, an elongated-transversely corrugated electromagnetic pick-up element positioned between said brushes adjacent to the surface of said material, means for passing said brushes over said material for passing an electric current substantially longitudinally through said material in a certain direction, a second pair of brushes positioned between said first pair of brushes and contacting said material for passing a second electric current through said material in a direction opposite to that of said first electric current for neutralizing the magnetic effects of that portion of said first electric current which passes directly beneath said electromagnetic pick-up element, and indicating means coupled to said pick-up element for registering the effect of the flaws in said material.

8. In electrical apparatus for calibrating flaw recording apparatus, the combination of an electromagnet, means for impressing an electric current upon the winding of said electromagnet, means for measuring said current, means for varying the magnitude of said current, means for periodically distorting the pattern of the magnetic field of said electromagnet, an elongated transversely-corrugated member positioned in the field of said lines of force for cutting said lines of force of said magnetic field each time said field is distorted for producing an electromotive force commensurate with the magnitude of the magnetic flux cut and means for impressing said electromotive force upon indicating apparatus to be calibrated.

9. In electrical apparatus for calibrating flaw recording apparatus, the combination of an electromagnet, means for impressing an electric current upon the winding of said electromagnet, means for measuring said current, means for varying the magnitude of said current, a pendulum supported to oscillate adjacent to said electromagnet, means for setting said pendulum into oscillation for periodically distorting the magnetic field of said electromagnet, an elongated member positioned in the field of said electromagnet for cutting lines of force of said field in accordance with the motion of said pendulum, and means for impressing electromotive forces from said elongated member on circuits of indicating apparatus being calibrated.

JOSEPH P. MUELLEMAN.